US011162504B2

(12) United States Patent
Grann et al.

(10) Patent No.: US 11,162,504 B2
(45) Date of Patent: Nov. 2, 2021

(54) CENTRIFUGAL PUMP

(71) Applicant: GRUNDFOS HOLDING A/S, Bjerringbro (DK)

(72) Inventors: Helge Grann, Bjerringbro (DK); John Frigård Nielsen, Fårup (DK); Erik Bundesen Svarre, Bjerringbro (DK); Per Frost Vedsted, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 28 days.

(21) Appl. No.: 16/472,596

(22) PCT Filed: Dec. 22, 2017

(86) PCT No.: PCT/EP2017/084339
§ 371 (c)(1),
(2) Date: Jun. 21, 2019

(87) PCT Pub. No.: WO2018/115417
PCT Pub. Date: Jun. 28, 2018

(65) Prior Publication Data
US 2019/0316595 A1 Oct. 17, 2019

(30) Foreign Application Priority Data
Dec. 23, 2016 (EP) ..................................... 16206579

(51) Int. Cl.
*F04D 29/12* (2006.01)
*F04D 1/06* (2006.01)
(Continued)

(52) U.S. Cl.
CPC ............... *F04D 29/12* (2013.01); *F04D 1/06* (2013.01); *F16J 15/3464* (2013.01)

(58) Field of Classification Search
CPC .. F16J 15/348; F16J 15/38; F16J 15/36; F16J 15/162; F16J 15/3404; F16J 15/3464;
(Continued)

(56) References Cited

U.S. PATENT DOCUMENTS 2,243,227 A 5/1941 Stratton
3,495,840 A 2/1970 Wilk
(Continued)

FOREIGN PATENT DOCUMENTS

CN 201232656 Y 5/2009
GB 2155120 A 9/1985

OTHER PUBLICATIONS

"Design of Mechanical Principles and Design Course", p. 87.
"Refinery Machine and Maintenance Repair", p. 280.
"Handbook of Seal Use", p. 388.

*Primary Examiner* — J. Todd Newton
*Assistant Examiner* — Eric J Zamora Alvarez
(74) *Attorney, Agent, or Firm* — McGlew and Tuttle, P.C.

(57) ABSTRACT

A cartridge seal is provided for sealing a shaft (4) with respect to a housing (2) and is intended to be a slide ring seal arrangement (12) for a centrifugal pump. The cartridge seal includes a shaft protection sleeve which is rotationally connected to the shaft (4) by a retaining ring, a support (24) for incorporating the cartridge seal into a housing opening of the pump housing (2), a slide ring which is rotationally connected to the shaft protection sleeve and a counter slide ring which is rotationally connected to the support (24), as well as an enclosed space (30) within the sealing arrangement. The space (30) is fluidically connected to a sealing gap formed between the slide ring and the counter slide ring, and is at least partially prefilled with liquid in order to prevent dry running when the pump is operated for the first time.

8 Claims, 6 Drawing Sheets (51) Int. Cl.
*F16J 15/34* (2006.01)
*F04D 29/10* (2006.01)
*F04D 1/00* (2006.01)

(58) Field of Classification Search
CPC ........ F16J 15/3452; F16J 15/34; F16J 15/344;
F16J 15/3484; F16J 15/16; F16J 15/3412;
F16J 15/342; F16J 15/3488; F16J 15/00;
F04D 29/12; F04D 29/126; F04D 29/128;
F04D 29/122; F04D 29/426; F04D 17/08;
F04D 29/10; F04D 29/22; F04D 1/06;
Y10S 277/93; Y10S 277/91; F01D 11/04;
F05D 2240/55
See application file for complete search history.

(56) References Cited

U.S. PATENT DOCUMENTS

| | | | | |
|---|---|---|---|---|
| 3,746,350 | A * | 7/1973 | Mayer | F16J 15/3404 |
| | | | | 277/399 |
| 3,762,724 | A | 10/1973 | Porter | |
| 4,342,538 | A * | 8/1982 | Wolford | F16J 15/36 |
| | | | | 415/231 |
| 10,677,247 | B2 * | 6/2020 | Vasagar | F16J 15/00 |
| 2013/0161912 | A1 | 6/2013 | Sauter et al. | |

* cited by examiner

CENTRIFUGAL PUMP

CROSS REFERENCE TO RELATED APPLICATIONS

This application is a United States National Phase Application of International Application PCT/EP2017/084339 filed Dec. 22, 2017, and claims the benefit of priority under 35 U.S.C. § 119 of European Application 16 206 579.1, filed Dec. 23, 2016, the entire contents of which are incorporated herein by reference.

TECHNICAL FIELD

The invention relates to a method for manufacturing a shaft seal arrangement, in particular on a centrifugal pump for sealing a shaft with respect to a surrounding casing, to a centrifugal pump with such a seal arrangement as well as to a cartridge seal.

TECHNICAL BACKGROUND

With centrifugal pumps, it is counted as belonging to the state of the art to seal the delivery-side end of the shaft, on which one or more impellers are seated, with respect to the pump casing, by way of a shaft seal arrangement. Such a seal arrangement comprises a rotating slide ring which co-rotates with the shaft, as well as a stationary slide ring which is fixedly arranged on the casing, and the sliding surfaces of these form a sealing gap which on operation of the pump is mostly fluid-lubricated by way of the delivery medium of the pump. The rotating slide ring and the stationary slide ring are otherwise sealed with respect to the shaft and to the pump casing respectively, via sealing rings. Thereby, one of the rings of the shaft seal is arranged axially displaceably and is subjected to spring force, in order to keep the sealing gap closed as much as possible, and thus to ensure the sealing function.

It is particularly with multi-stage centrifugal pumps that such a seal arrangement must maintain the sealing of a high pressure level at the exit of the last pump stage, with respect to the ambient pressure.

Such seal arrangements can either be arranged directly between the shaft and the casing opening or be in the form of a cartridge seal, with which a sleeve is fastened on the shaft and sealed with respect to the shaft, and the seal arrangement is then arranged between the casing opening and this sleeve. The latter construction type has the great advantage that the complete shaft seal arrangement is exchangeable, without having to disassemble the shaft/casing arrangement.

In the case of centrifugal pumps, such shaft seal arrangements are provided in various construction types, and their application has been found to be quite successful. However, the disadvantage with such types of shaft seal arrangements is the fact that since they are lubricated by the delivery fluid of the pump, this delivery fluid must pass through the seal arrangement as quickly as possible on starting operation of the pump, so that the desired lubrication of the shaft seal by the delivery fluid occurs. For this reason, in the operating instructions of such pumps, it is also regularly pointed out that the pump should be filled with delivery fluid before starting operation, which however does not always occur. If the shaft seal arrangement runs dry, then this is destroyed on its own accord within a very short time due to friction and the development of heat.

Although it is counted as belonging to the state of the art to lubricate such shaft seal arrangements independently of the delivery fluid, however, the effort with regard to design and maintenance is comparatively high due to the fact that on the one hand the lubricant is to be metered accordingly and on the other hand is to be refilled after a certain time. Such a seal arrangement is known from U.S. Pat. No. 3,495,840.

A shaft seal arrangement, as is known from GB 2 155 120 A and with which is sponge-like ring serves as a reservoir for the lubricant in the case that the pump runs dry, is counted as belonging to the state of the art.

From US 2013/0161912 A1, it is counted as belonging to the state of the art to provide a cavity within the seal arrangement, said cavity being filled with delivery fluid, as soon as the suction side of the pump fills with fluid.

SUMMARY

Departing from the initially mentioned state of the art, it is the object of the invention to provide a method for manufacturing a shaft seal arrangement which overcomes the aforementioned disadvantages as well as in a further development to design a centrifugal pump with a corresponding shaft seal arrangement and to accordingly design a cartridge seal.

The method according to the invention, for manufacturing a shaft seal arrangement, in particular of centrifugal pump for sealing a shaft with respect to a surrounding casing is based on a cavity which is formed within the seal arrangement and which is in fluid-leading connection with the sealing gap between the slide rings being at least partly filled with a fluid during the assembly of the shaft seal arrangement.

The solution according to the invention therefore is based on the shaft seal arrangement being provided with a fluid already on its assembly, which effectively prevents this seal arrangement from running up dry on starting operation of the assembly which is provided with the shaft seal arrangement. The method according to the invention has the advantage that the shaft seal arrangement does not need to given any special treatment before starting operation, in particular does not need to be provided with a fluid reserve or filled with a fluid in any other manner before starting operation. The filling of the fluid during the assembly further has the advantage that this can be effected when the seal arrangement is not yet closed off, by which means the filling of the fluid can be effected quickly and simply. This therefore, if the seal arrangement is provided for example for a centrifugal pump, can be effected during the assembly of the centrifugal pump and can mostly be integrated into the assembly as a simple intermediate step. In the case of a cartridge seal, this can be effected particularly advantageously during the assembly of the seal itself, which, prefilled with fluid, can then be made available for its purpose of application, wherein this cartridge seal which is prefilled with fluid, with regard to handling and assembly does not differ from the cartridge seals according to the state of the art, thus can replace these without further ado.

The single-stage or multi-stage centrifugal pump according to the invention comprises a pump casing with a shaft which is rotatably arranged therein and which has at least one impeller which is arranged on the shaft, for the delivery of fluid. A shaft seal arrangement is arranged between the shaft and an opening of the casing, through which opening the shaft is led. This seal arrangement comprises a cavity. According to the invention, this cavity is at least partly pre-filled with a fluid, wherein the fluid has already been filled in on assembly of the seal arrangement.

A cartridge seal for sealing a shaft with respect to a casing, in particular as a shaft seal arrangement for a centrifugal pump, comprises a shaft protective sleeve which is provided for the rotationally fixed connection to the shaft, as well as a carrier which is provided for the integration of the cartridge seal into a casing opening. A rotating slide ring is rotationally fixedly arranged on the shaft protection sleeve (in a rotationally fixed manner), and a stationary slide ring is rotationally fixedly connected to the carrier (in a rotationally fixed manner). With this cartridge seal too, a closed-off cavity is provided, which according to the invention is fluid conveyingly connected (in a fluid-leading (fluidic) manner) to a sealing gap which is formed between the rotating slide ring and the stationary slide ring and which is at least partly pre-filled with a fluid. The rotating slide ring is herein subjected to spring force in the direction of the stationary slide ring, and the spring is supported axially on a component which is fastened to the shaft protection sleeve. Since the cartridge seal according to the invention has already been prefilled with fluid during the assembly, given a later installation, be it on assembly of an assembly, in particular of a centrifugal pump or only on replacing an existing cartridge seal, it can be handled as is the case with cartridge seals according to the state of the art, and therefore no changes with regard to assembly technology result at all and it is ensured that a dry-running of the seal arrangement on starting operation is reliably prevented.

A basic concept of the present invention, in the case of a shaft seal arrangement of a single-stage or of multi-stage centrifugal pump which is lubricated by the delivery fluid of the pump, is to at least partly pre-fill the cavity which is present within the seal arrangement in any case, with a fluid, in order to ensure that on starting operation of the pump, the shaft seal arrangement, in particular the sealing gap between the rotating slide ring and the stationary slide ring is fluid-lubricated, even if the pump is still not yet filled with fluid and does not yet deliver, as is regularly the case with starting operation for the first time. This solution according to the invention can be applied with pumps, concerning which a shaft seal arrangement is provided directly between the shaft and the pump casing, as well as with pumps, concerning which a cartridge seal is applied. The invention can moreover advantageously also be used for the cartridge seal as such, in order to ensure that the danger of dry running which could possibly occur again at the beginning of the pump operation even after exchange of the cartridge seal is effectively prevented. Herein, in the simplest form, a cavity which with regard to design is present in any case within the seal arrangement can be utilized, and this merely needs to be the case of a closed-off space, thus one which is sealed off to the pump interior as well as to the outside and which is fluid conveyingly connected to the sealing gap (in a fluid-leading manner) and specifically at the side of the sealing gap which is remote from the delivery side, thus typically at the inner side of the sealing gap.

Alternately or additionally, a cavity can be provided within the seal arrangement especially for this.

The shaft seal arrangement of the centrifugal pump according to the invention advantageously comprises two slide rings with axial sliding surfaces, of which one is rotationally fixedly connected to the shaft (in a rotational fixed manner), and the other, the stationary slide ring, is rotationally fixedly connected to the pump casing (in a rotationally fixed manner). The closed-off cavity is herein advantageously arranged directly adjacently to the stationary slide ring, and specifically preferably at an opposite side which is away from the stationary sliding surfaces, thus quasi at the rear side of the stationary slide ring. The fluid-leading connection of the cavity to the sealing gap between the sliding surfaces is thereby advantageously effected via the gap between the stationary slide ring and the shaft, said gap being present in any case. The fluid which is located in the cavity thus gets via this gap from the inner side up to the sealing gap, thus on operation on the side of the sealing gap which is not under pressure.

According to a further development of the invention, it is particularly advantageous if the pre-filled cavity is arranged such that it is arranged above the stationary slide ring with designated operation of the pump. It is then ensured that the fluid located in the cavity gets to the sealing gap on account of gravity. Basically, the cavity can also be arranged next to the stationary slide ring with designated operation of the pump, but then the fluid is possibly only present at a part of the sealing gap and not over the whole periphery. This pre-filling effect of the seal arrangement can thus also be applied to centrifugal pumps which are operated with a horizontal shaft.

With the previously described design according to the invention, with which the cavity is arranged above the stationary slide ring given designated operation of the pump, then in particular, but not exclusively, this cavity can advantageously be only partly filled with fluid, without losing the advantageous characteristics, specifically of a fluid lubrication on running up the dry pump. With a suitable design arrangement and fashioning of the cavity, it can be sufficient to pre-fill this to share (occupy) at least 10-50% of the cavity volume, in order to ensure this. The only partial pre-filling of the cavity is particularly advantageous with regard to manufacturing technology, since no significant changes need to the effected on assembly of the pump assembly for this partial pre-filling of the cavity. In particular, a complete fluid pre-filling of the cavity necessitates complicated interventions in the assembly procedure.

The pre-filling of this cavity in the seal arrangement is advantageously effected with a fluid which also represents the delivery medium on later operation, thus for example water. Since however it is mostly not known on the part of the manufacturer as to which medium is to be delivered by the pump at a later stage, it is useful to apply a fluid which on the one hand has good lubrication properties, but on the other hand is water-compatible, such as for example glycol or glycerine. With regard to the storage capability, here it is useful to pre-fill a fluid which is frost-proof in the usual temperature range. Glycol, glycerine or coolant is also advantageous inasmuch as this is concerned.

The cavity is to be sealed in a suitable manner, so that the pre-filled fluid remains within the cavity. The sealing towards the sealing gap results by way of the shaft seal itself, and the cavity is advantageously sealed to the outside by way of a sealing ring. This cavity sealing ring which acts towards the surroundings is advantageously configured as a lip sealing ring and/or labyrinth sealing ring. This cavity sealing ring can advantageously be configured as a combined lip-labyrinth seal, wherein the lip seal serves for sealingly closing off the pre-filled cavity to the outside after assembly of the pump. In contrast, on operation, a complete sealing as a rule does not make any sense, since the delivery medium which evaporates in the sealing gap of the seal and which thereby enlarges its volume must be able to exit through this seal. The lip seal can therefore be configured such that on operation, it closes relatively rapidly and forms play, so that it is then only the labyrinth seal which continues to act or a reduced sealing effect is accepted.

In the case of a roughly ring-cylindrical shape of the cavity, it is advantageous to provide the cavity seal with a roughly U-shaped or L-shaped ring cross section, wherein preferably a shaft-side limb of the U is configured longer than the other one, and the web of the U or the short limb of the L is arranged on a wall which is delimits the cavity and which is distanced to the stationary slide ring. The long limb forms the actual seal between the rotating shaft and the stationary wall, wherein the cavity sealing ring is fixed on the stationary part of the casing, thus typically on the wall. After completion of the pump, thus after the pre-filling of the cavity and completed assembly, the long limb of the U or of the L serves for a reliable sealing with respect to the shaft, but on the other hand on operation permits a gap formation with a labyrinth effect.

The cavity sealing ring is advantageously fastened on a carrier, to which carrier the stationary slide ring is fastened at the casing side. Such a preferably material connection can be effected for example by way of bonding or vulcanisation. Alternatively, the cavity sealing ring can non-positively sit in its sealing position, thus be pressed into the cavity. It is particularly in the case of larger pumps that the cavity seal can also be fastened on the carrier side by way of a thread. Such an arrangement or also a non-positive arrangement also permits the exchange of the seal in the case of wearing or a defect.

Although it can be advantageous to utilize the cavity which is present in any case with a shaft seal arrangement, for pre-filling and, as the case may be, to only modify this with regard to its sealing, however, the solution according to the invention can also be advantageously realized by a cavity which is created in a targeted manner for such purposes. In the case of a shaft seal arrangement with two slide rings with axial sliding surfaces, of which one is rotationally fixedly connected to the shaft (in a rotationally fixed manner) and the other, the stationary slide ring is rotationally fixedly connected to the pump housing (in a rotationally fixed manner), the cavity can advantageously also be provided on the carrier, to which carrier the stationary slide ring is fixed on the casing side, or on the stationary slide ring itself. The respective cavity is then to be fluid conveyingly connected to the sealing gap between the sliding surfaces (in a fluid-leading manner), which with the arrangement of the cavity can realized in a simple manner by way of the cavity being configured open towards the shaft or at least comprising openings, so that a fluid-leading connection is formed via the gap which is present in any case, between the carrier and shaft which is to say between the stationary slide ring and the shaft. The cavity itself can advantageously also be formed by way of incorporating a suitable groove on the inner side of the carrier or of the stationary slide ring.

The sealing ring is to be configured in accordance with the design of the cavity. It is particularly advantageous if this sealing ring has an I-shaped, X-shaped or W-shaped ring cross section, since these cross-sectional shapes on the one hand are predestined to reliably sealingly close off the cavity (in a sealed manner) after the pre-filling, but on the other hand, on later operation, to permit gas to escape as the case maybe, which is to say to form a gap in the case of a pressure increase, said gap subsequently closing again.

It is particularly advantageous if the seal arrangement according to the invention is formed by a pre-filled cartridge seal, since it is then also ensured that the necessary lubrication for the seal arrangement is ensured by the fluid located in the cavity, in the case of an exchange of the seal arrangement, after which the pump again firstly starts up without delivery fluid, as with starting operation for the first time.

Such a cartridge seal which is provided for sealing the shaft with respect to the pump casing can basically be configured in the same manner as that which has been described beforehand, wherein a shaft protection sleeve takes the place of the shaft. The shaft protection sleeve is applied onto the delivery-side and free shaft end, is sealed with respect to the shaft by way of a sealing ring and is typically rotationally fixedly connected to the shaft (in a rotationally fixed manner) outside the seal arrangement. This can be effected for example by way of a ring which is integrally formed on the sleeve and which comprises radially arranged screws, with which screws the ring is rotationally fixed on the shaft (in a rotationally fixed manner). The cartridge seal moreover comprises a carrier for the integration of the cartridge seal into a casing opening, on which carrier a stationary slide ring is rotationally fixedly arranged (in a rotationally fixed manner). The rotating slide ring which rotates with the shaft is mounted on the shaft protection sleeve rotationally fixed, but axially displaceable and is subjected to force in the direction of the stationary slide ring by way of a spring which is supported on the shaft protection sleeve via a component. Such cartridge seals are counted as belonging to the state of the art and typically comprise a closed-off cavity which is fluid conveyingly connected (in a fluid-leading manner) to a sealing gap formed between the rotating slide ring and the stationary slide ring. According to the invention, this cavity is at least partly pre-filled with a fluid which has been filled in during the assembly of the cartridge seal.

This cavity is advantageously arranged between the shaft projection sleeve, the carrier and the stationary slide ring, and then the fluid-leading connection to the sealing gap is effected through the gap existing between the stationary slide ring and the shaft projection sleeve. Alternatively, this cavity however can also be provided on the carrier or on the stationary slide ring, for example by way of a groove which is peripheral in these components and is open to the shaft projection sleeve, or by way of an annular space which is suitably fluid conveyingly connected to the sealing gap (in a fluid-leading manner). Thereby, the cavity is advantageously configured such that it only needs to be partly pre-filled with fluid, preferably to a share of at least 10 to 50% of the cavity volume. This simplifies the assembly of the cartridge seal, so that the pre-filling can be integrated into known assembly procedures without major disruptive interventions.

Advantageously, the arrangement and the design of the seal arrangement can be basically effected in the same manner as was described beforehand, wherein the shaft protection sleeve takes the place of the shaft.

The inventive design of the seal arrangement, apart from the actual shaft seal arrangement, comprises sealing means for sealing the shaft protection sleeve with respect to the shaft, for example an O-ring which is integrated therebetween, sealing means for sealing the carrier with respect to the casing opening, sealing means for sealing the stationary slide ring with respect to the carrier and sealing means for sealing the carrier with respect to the shaft protection sleeve. Thereby, as is common with such axial shaft seals, the rotating slide ring is typically mounted on the shaft or the shaft protection sleeve axially displaceable, but rotationally fixed, wherein spring means are provided, which subject the rotating slide ring to force towards the stationary slide ring.

Thereby, the design according to the invention, independently of whether it is configured as a cartridge seal or as a direct sealing with respect to the shaft, can either be subjected to force via a biased spring or via a metal bellows, as is counted as belonging to the state of the art and is therefore not described in more detail here.

The cavity sealing ring can advantageously be configured analogously to the case of a seal arrangement connecting directly onto the shaft, also with the design as a cartridge seal.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
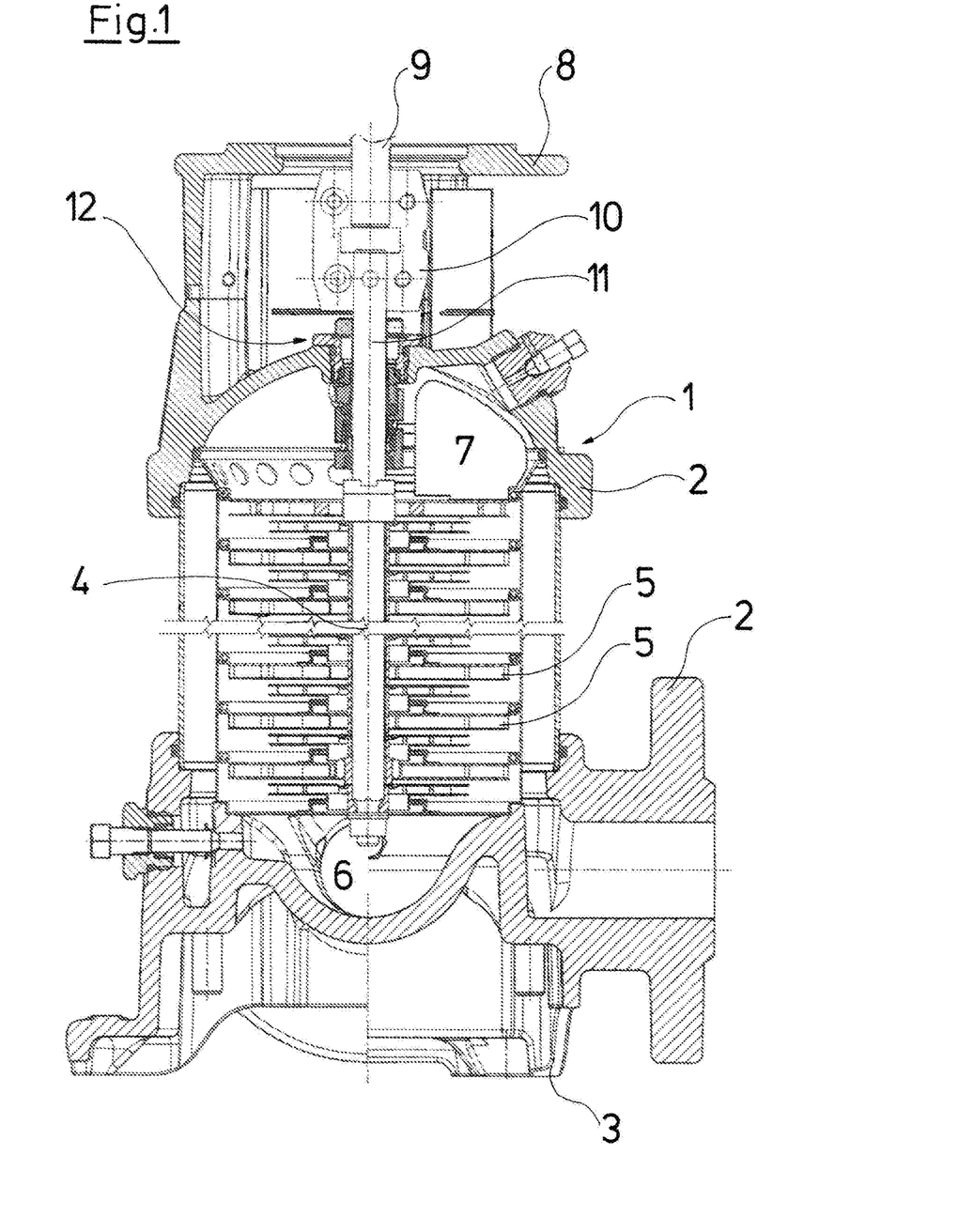
FIG. 1 is a greatly simplified schematic, longitudinal sectional view through a multi-stage centrifugal pump with a shaft seal arrangement in cartridge form, between the shaft and the casing.

Referring to the drawings, with regard to the pump represented by way of FIG. 1, a multi-stage centrifugal pump 1, with a pump casing 2 comprises a foot 3, with which the pump casing 2 can be arranged standing on the ground, wherein a shaft 4 which is rotatably mounted within the casing 2 is arranged vertically. The shaft 4 carries a number of impellers 5 corresponding to the number of pump stages. The fluid to be delivered is delivered from the suction port 6 arranged at the end of the shaft which is at the bottom in FIG. 1, upward to a delivery chamber 7, from where it is led to the delivery connection of the pump casing 2. The upper side of the pump casing 2 is configured as a motor base 8 and is envisaged for receiving an electric motor, whose pump-side shaft end 9 via a coupling 10 is rotationally fixedly connected to the end of the shaft 4 which is led upwards out of the actual pump casing 2.

Figure 2:
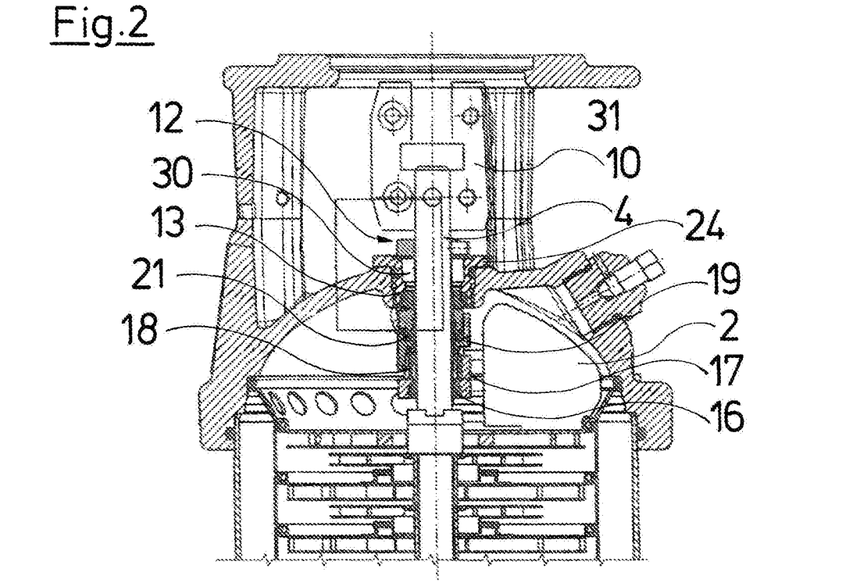
FIG. 2 is an enlarged sectioned representation showing the region of the shaft feed-through, through the pump casing, of the pump according to FIG. 1.

The pump-side shaft end 11 is led through an opening 13 of the pump casing 2 by way of a shaft seal arrangement 12. The shaft seal arrangement 12 is configured as cartridge seal and comprises a protective sleeve 14 which is pushed with a slight play over the shaft end 11 of the shaft 4 and is sealed with respect to the shaft 4 by way of a sealing ring 16, close to the lower end of the protective sleeve 14. The upper end of the protective sleeve 14 which projects upwards beyond the opening 13 is rotationally fixedly connected to the shaft end 11 by way of a holding ring 15. For this, screws which rotationally fixedly connect the holding ring 15, together with the upper end of the protective sleeve 14, to the shaft 4, are arranged radially in the holding ring 15, as is basically counted as belonging to the state of the art with such cartridge seals. At the outside, a catch 17 is rotationally fixedly arranged close to the lower end of the protective sleeve 14, roughly where the sealing ring 16 is arranged, and this catch 17 on the one hand axially supports a helical spring 18 surrounding the respective sleeve 14, to the bottom, and on the other hand rotationally fixedly holds a catch 19, wherein this catch 19 is axially movably arranged on the protective sleeve 14 and in turn rotationally fixedly receives a rotating slide ring 20, wherein the upper axial surface of this slide ring forms the rotating sliding surface of the shaft seal arrangement 12 which co-rotates with the shaft 4. An O-ring 21 is arranged between the rotating slide ring 20 and the receiving catch 19 and seals these components with respect to the protective sleeve 14. The components 14 to 21 described above form the parts of the shaft seal arrangement 12 which co-rotate with the shaft 4.

Figure 3:
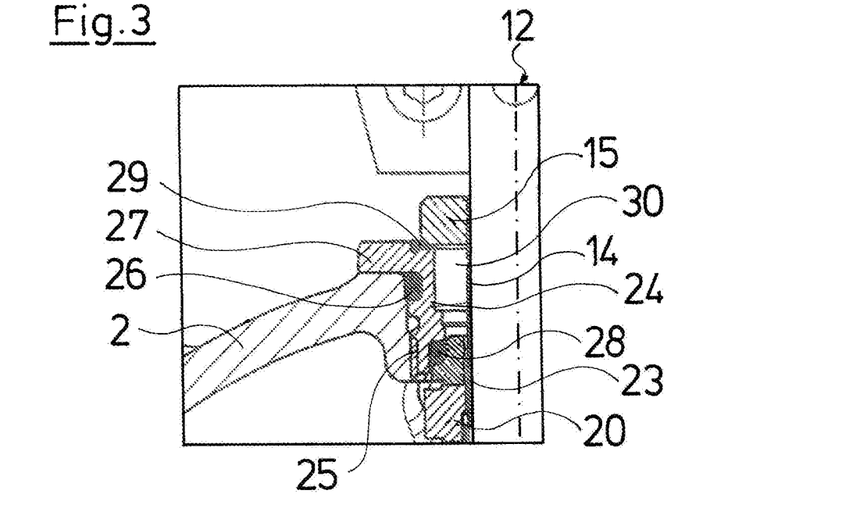
FIG. 3 is a further enlarged, schematic sectional representation of a part of the shaft seal arrangement of FIG. 2.

In contrast to this, a stationary slide ring 22, also called stationary ring and whose downwardly facing an axial surface forms the rotationally fixedly arranged stationary surface for the rotating slide ring 20 is rotationally fixed. A separating gap 23 which forms the actual shaft seal is formed between the upwardly directed rotating sliding surface of the rotating slide ring 20 and the downwards directed stationary sliding surface of the stationary slide ring 22.

The stationary slide ring 22 surrounds the protective sleeve 14 with play and rotationally fixedly received in an essentially hollow-cylindrical carrier 24, said carrier at its outer side comprising an outer thread 25, with which it is fastened in the corresponding inner thread of the opening 13 of the pump casing 2. A peripheral groove, in which an O-ring 26 is arranged connects upwards onto the thread 25, said O-ring sealing the carrier 24 with respect to the opening 13 of the pump casing 12. The upper end of the annular carrier 24 is formed by a flange/flange-like projection 27 which lies on the upper side of the pump casing 2, surrounding the opening 13. The carrier 24 shoulder configuration at the inner side, so that the carrier 24 can axially support the stationary slide ring 22 to the top. An O-ring 28 which seals the stationary slide ring 22 with the inside of the carrier 24 with respect to the delivery chamber 7 is provided between the stationary slide ring 22 and the carrier 24.

Alternatively, the carrier can be fastened to the pump casing 2 via fastening screws which pass through the flange 27 and connect to the pump casing 2. The thread 25 is not then necessary. This embodiment is particularly advantageous for larger pumps.

Figure 4:
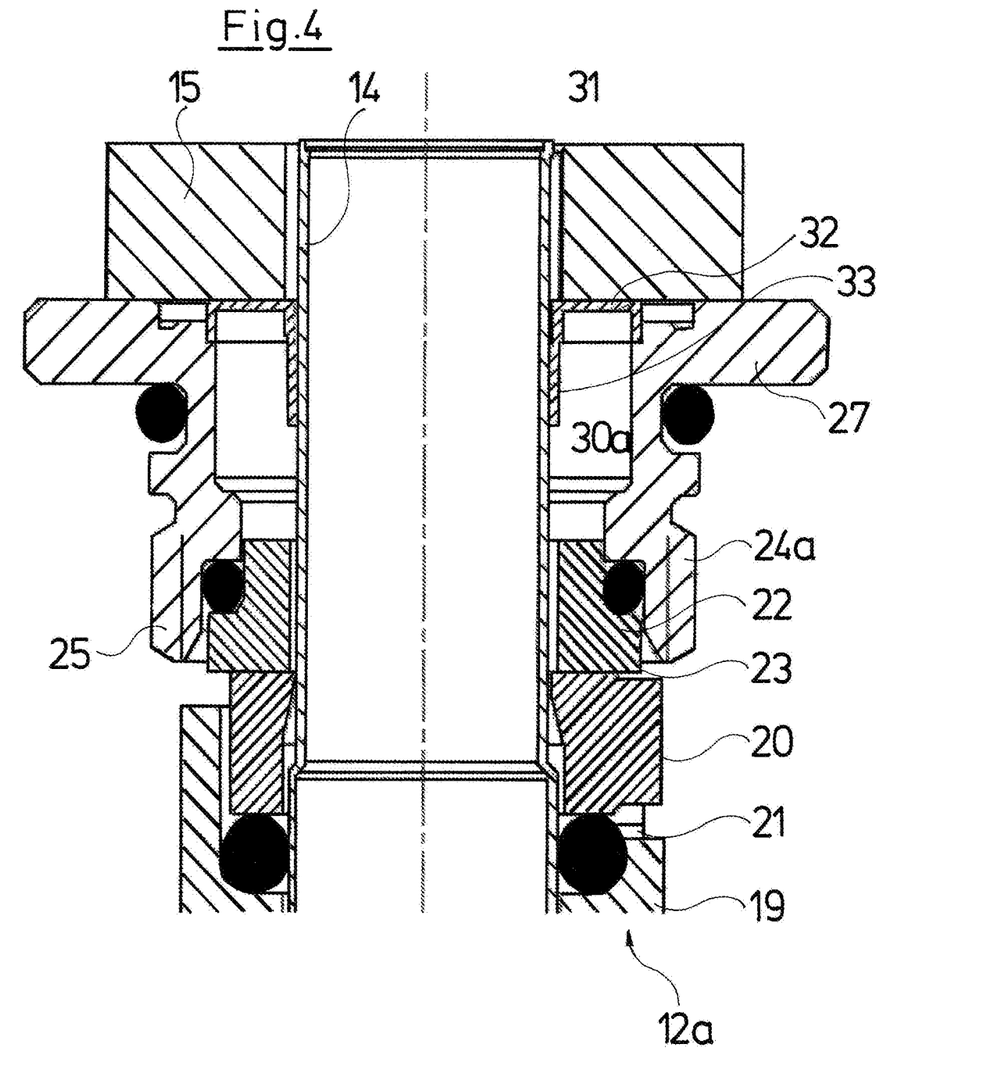
FIG. 4 is an enlarged sectional representation of a further embodiment of a cartridge seal.

It is advantageous if the U-profile of the sealing ring 32 is stiffened out with radially arranged webs which are uniformly distributed, which is to say are arranged in a star configuration (in a star-like manner) and run radially between the two limbs and the web of the U. The sealing ring 32 can alternatively also have an L-shaped ring cross section, wherein the long limb extends on the protective sleeve side, whereas the short limb reaches to into the region between the carrier 24a and holding ring 15. This design is not shown.

A further sealing ring 29 is arranged between the flange 27 of the carrier 24 which is fixed to the housing, and the holding ring 15 co-rotating with the shaft 4, and seals these components to one another. With regard to the embodiment example represented by way of FIGS. 1 to 3, the holding ring 15 is sealingly connected to the protective sleeve 14, so that a closed cavity 30 forms between the inner side of the carrier 24, between the lower side of the holding ring 15, the outer periphery of the protective sleeve 14 in this region and the upper side of the stationary slide ring 22 as well as of the gap between the stationary slide ring 22 and the shaft protection sleeve 14, up to the sealing gap 23, and this cavity on the one hand is sealed with respect to the surroundings 31 and on the other hand with respect to the delivery chamber 7. This cavity 30 is filled with fluid, so that when the pump starts up for the first time and it is not yet ensured that the delivery chamber 7 is filled with fluid, it is ensured that this fluid in the cavity 30 is present at the inner side of the sealing gap 23 via the gap between the stationary slide ring 22 and the protective sleeve 14 and ensures that the shaft seal is lubricated by fluid. The fluid quantity in the cavity 30 is sufficient, in order to adequately lubricate the shaft seal, even with an extended dry running As soon as the pump delivers fluid, this is present at the delivery chamber side, so that the delivery fluid at the delivery pressure of the pump is present at the sealing gap 23 at the outer periphery. The shaft seal then assumes its designated operation, with which delivery fluid then gets into the sealing gap 23 and partly evaporates, wherein on account of the overpressure, the vapor at least partly is led away to the outside via the cavity 30 and via the sealing gap formed between the sealing ring 29 and the holding ring 15.

In the case of an exchange of the sealing cartridge, it is also ensured that no dry-running occurs on re-starting up the pump again, due to the fact that the cavity 30 of the cartridge seal is filled with fluid by the manufacturer.

Figure 7:
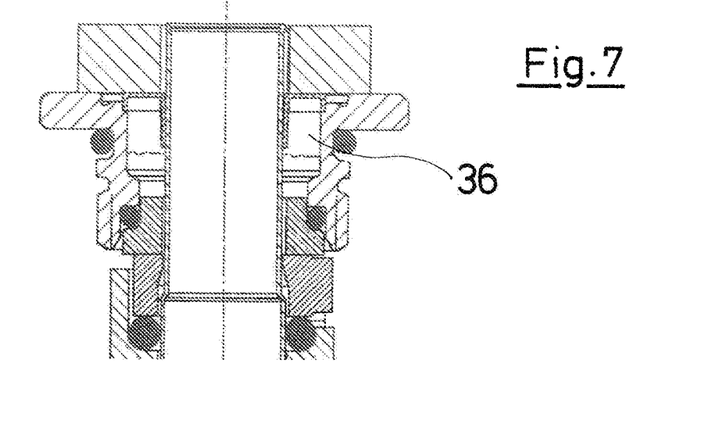
FIG. 7 is an enlarged sectional representation of the shaft seal arrangement according to FIG. 4, in one of three different positions, with a closed-off cavity within the seal arrangement, said cavity at least partly being pre-filled.
Figure 8:
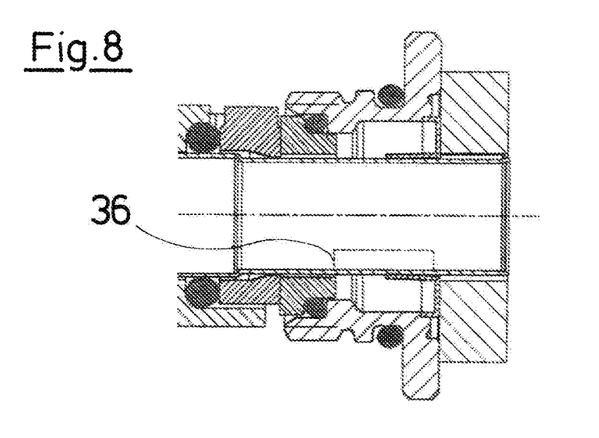
FIG. 8 is an enlarged sectional representation of the shaft seal arrangement according to FIG. 4, in another of three different positions, with a closed-off cavity within the seal arrangement, said cavity at least partly being pre-filled.
Figure 9:
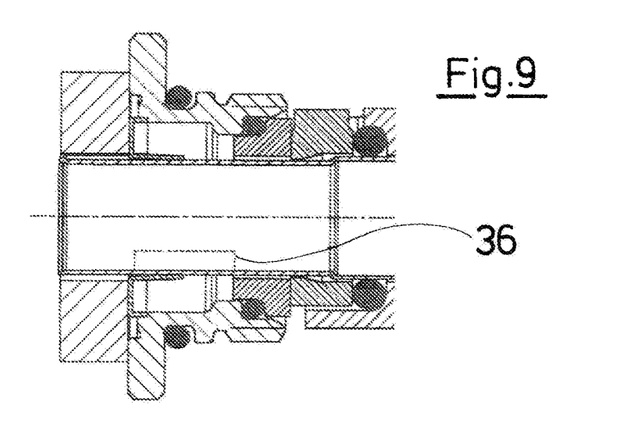
FIG. 9 is an enlarged sectional representation of the shaft seal arrangement according to FIG. 4, in another of three different positions, with a closed-off cavity within the seal arrangement, said cavity at least partly being pre-filled.

Thereby, it has been found that it is not necessary to completely fill the cavity 30 with fluid, but in contrast, it is sufficient to only partly fill this, as is illustrated by way of FIGS. 7 to 9 which shows a seal arrangement as is represented in FIG. 4, in different positions.

It is to be understood that the fluid filling or part-filling of the cavity 30 which was described beforehand and is for avoiding a dry running with a starting operation of the pump for the first time, not only functions with an arrangement of a cartridge seal, but also with a suitably constructed shaft seal arrangement without a cartridge, and then the protective sleeve 14 with the holding ring 15 is done away with, so that the carrier 24 in the region of the flange 27 is directly sealed with respect to the shaft 4, for example via an O-ring in a groove, in the same manner as the catch 17 is then directly sealed with respect to the shaft 4 by way of a sealing ring.

With the shaft seal arrangement 12a represented by way of FIG. 4, the holding ring 15 is not sealed with respect to the protective sleeve 14, but is merely rotationally fixedly connected to this. As a result, the cavity 30a between the inner side of the carrier 24, the lower side of the holding ring 15 as well at the outer side of the protective sleeve 14 is to be sealed. A sealing ring 32 is provided for this, and this is U-shaped in its ring cross section, is fixed with a short limb on the carrier side, bears on the holding ring 15 at the web side and with its long limb bears on the protective sleeve 14. Thereby, the long limb 33 forms a type of labyrinth seal on account of the length of the sealing gap to the protective sleeve 14, whereas a lip seal is formed towards the web region. In the case of a vapor pressure prevailing within the cavity 30a, this seal 32 is hence capable of dissipating this vapor pressure through the sealing gap into the surroundings 31 in a pressure-reducing manner and of subsequently closing the sealing gap again. This sealing ring 32 thus on the one hand ensures that the prefilled cavity 30a is sealed to the surroundings 31, but on the other hand permits the discharge of fluid, given a corresponding pressure increase in the cavity 30a.

Figure 5:
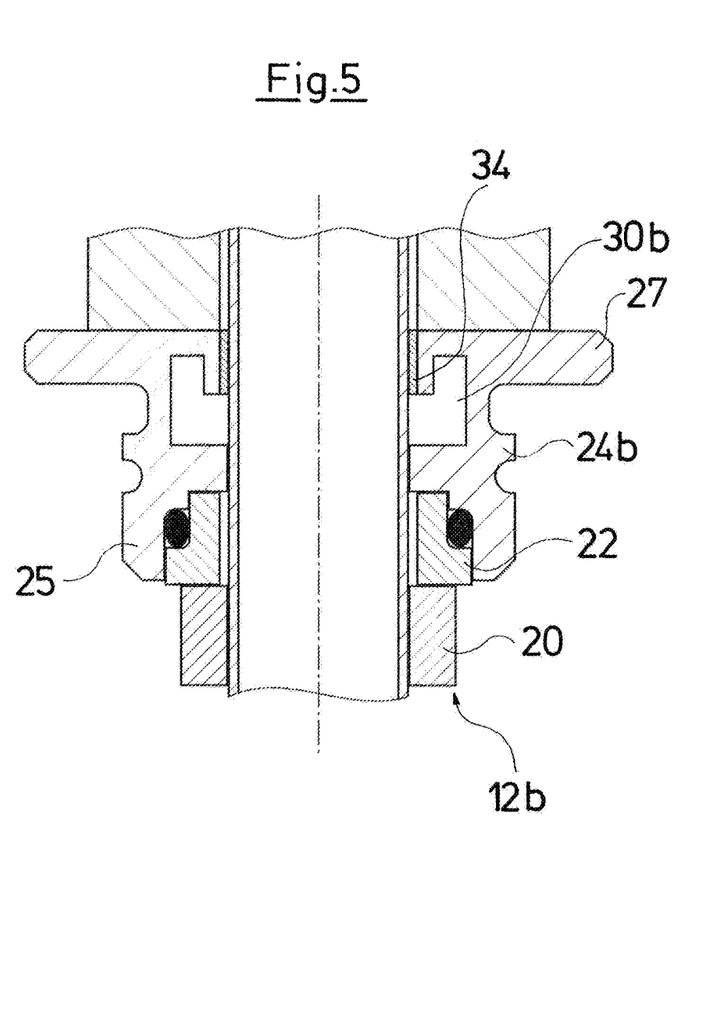
FIG. 5 is an enlarged sectional representation of a further embodiment of a cartridge seal.
Figure 6:
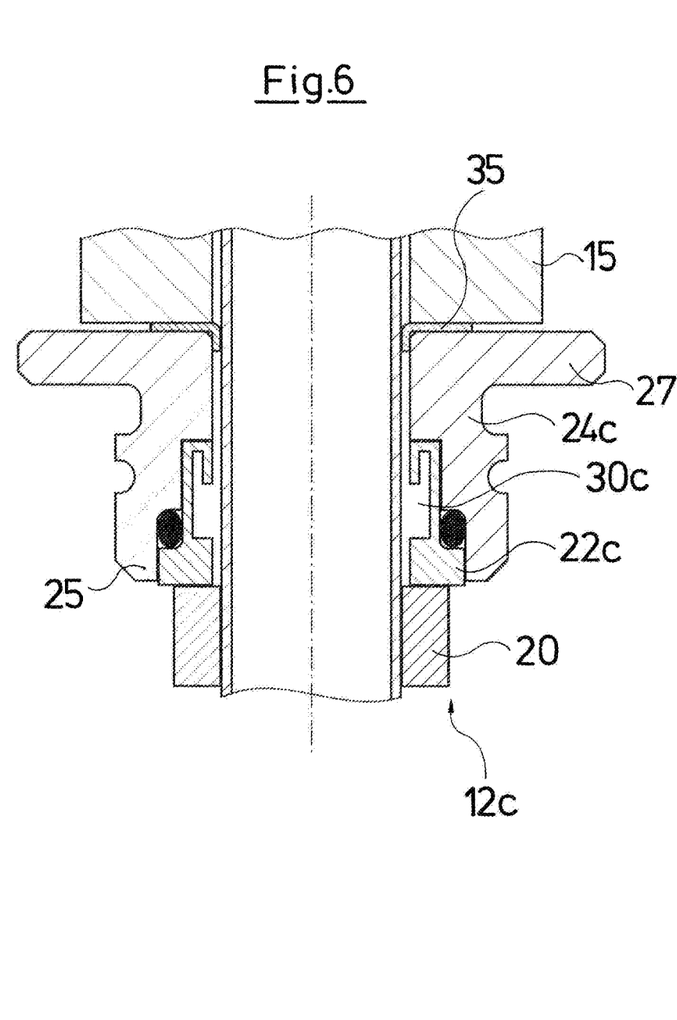
FIG. 6 is an enlarged sectional representation of of a further embodiment of a cartridge seal.
Figure 10:
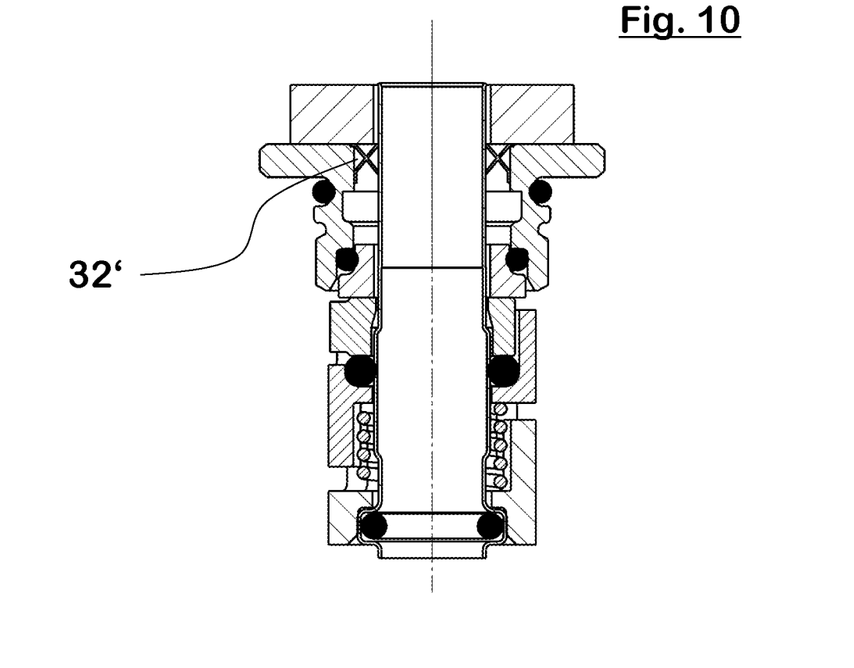
FIG. 10 is an enlarged sectional representation of a shaft seal arrangement with an annular seal having a X-shaped cross section.
Figure 11:
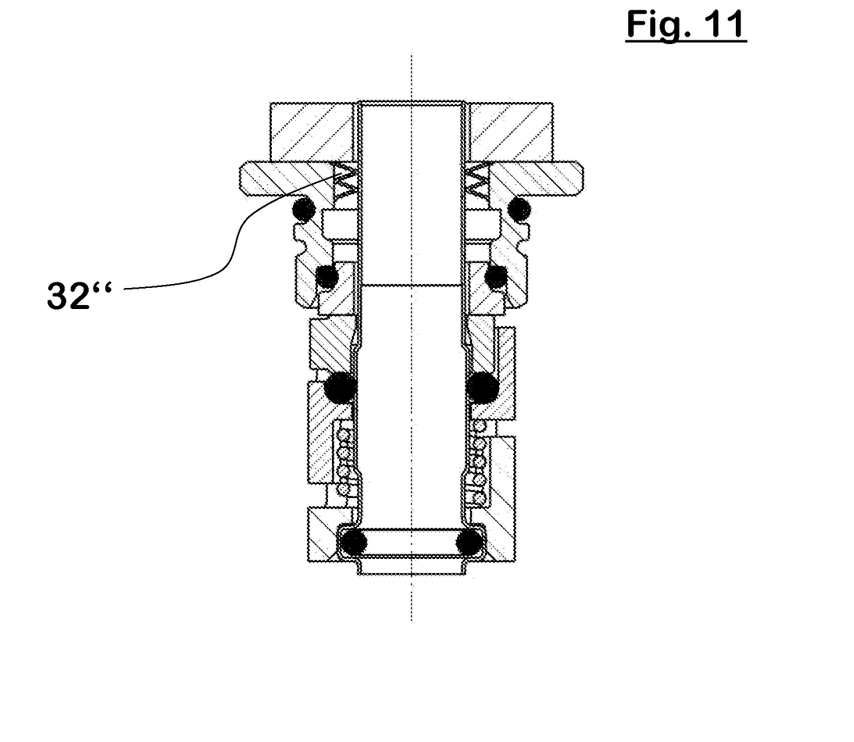
FIG. 11 is an enlarged sectional representation of a shaft seal arrangement with an annular seal having a W-shaped cross section.

The annular seal 32 which is represented here has a U-shaped ring cross section, but an X-shaped or W-shaped ring cross section can also alternatively be applied. By way of example, a sealing ring with an I-shaped ring cross section is represented in FIG. 5, and in FIG. 6 one with an L-shaped ring cross section, and these are for sealing the cavity 30b and 30c respectively. With the seal arrangement 12b according to FIG. 5, by way of example, it is shown that a cavity 30b can be completely incorporated into the carrier 24b by way of a corresponding annularly inner peripheral groove. The connection to the sealing gap 23 is effected via an annular gap between the inner side of the carrier 24b and the protective sleeve 14, said annular gap running into the annular gap between the stationary slide ring 22 and the protective sleeve 14 and thus being hydraulically connected to the sealing gap 23. With the embodiment variant represented by way of FIG. 6, the cavity 30c is placed completely into the stationary slide ring 22c which for this purpose comprises a peripheral groove which forms this cavity. With the arrangement according to FIG. 6, a sealing ring 35 is represented, wherein this is L-shaped in cross section, with its short limb seals the cavity between the inner side of the carrier 24c and the outer side of the protective sleeve 14 and its long limb lies on the upper side of the carrier 24c, thus on the flange 27 and seals with respect to the holding ring 15. FIG. 10 shows an annular seal 32' that has a X-shaped ring cross section. FIG. 11 shows an annular seal 32" that has a W-shaped ring cross section.

As to how the fluid behaves in cavity 30a when this is only partly filled, is represented by way of FIGS. 7 to 9. The fluid level is characterized at 36 in each case. With the arrangement with a standing shaft (arrangement of the pump as in FIG. 1) according to FIG. 7, a small fluid quantity is already sufficient, in order to ensure that adequate fluid is present at the sealing gap 23 on account of gravity. FIGS. 8 and 9 illustrate that, independently of the alignment, also with a lying shaft and with a part-filling of the cavity, the fluid level 36 although extending in the axial direction over the complete cavity 30a, however only extends partly in the peripheral direction. However, in practice this is not much of a problem since the rotating slide ring 20 rotates with respect to the stationary slide ring 22 and thus carries along the fluid which is only present in sections at the sealing gap 23, and distributes it uniformly over the complete gap. In practice, it has been found that such a partial filling which is particularly advantageous with regard to the technical aspects of assembly, is sufficient, in order to effectively prevent a dry running While specific embodiments of the invention have been shown and described in detail to illustrate the application of the principles of the invention, it will be understood that the invention may be embodied otherwise without departing from such principles.

The invention claimed is:

1. A cartridge seal for sealing a shaft with respect to a casing, as a shaft seal arrangement for a centrifugal pump, the cartridge seal comprising:
   a shaft protection sleeve;
   fixing means for providing a rotationally fixed connection of the shaft protection sleeve to the shaft;
   a carrier for integrating the cartridge seal into a casing opening;
   a rotating slide ring rotationally fixed to the shaft protection sleeve;
   a stationary slide ring rotationally fixed to the carrier;
   a closed cavity, wherein the closed cavity is fluid conveyingly connected to a sealing gap which is formed between the rotating slide ring and the stationary slide ring, and the closed cavity is at least partly pre-filled with a fluid; and
   a sealing means for sealing the carrier with respect to the shaft protection sleeve, the sealing means comprising a cavity sealing ring which is configured as a lip seal and/or labyrinth seal, wherein one of:
      the closed cavity is arranged between the shaft protection sleeve, the carrier and the stationary slide ring;
      the closed cavity is arranged on the carrier; and
      the closed cavity is arranged on the stationary slide ring.

2. A cartridge seal according to claim 1, wherein the closed cavity is only partly filled with the fluid, the fluid occupying at least 10% to 50% of the cavity volume.

3. A cartridge seal according to claim 1, wherein the cavity sealing ring has a ring cross section which is I-shaped, L-shaped, U-shaped, X-shaped or W-shaped.

4. A cartridge seal according to claim 1, wherein the cavity sealing ring has a U-shaped ring cross section, wherein a limb of the U-shape, which is on a side of the shaft, is configured longer than another limb of the U-shape, and a web of the U-shape is arranged on a wall which delimits the closed cavity and which is distanced to the stationary slide ring, wherein the cavity sealing ring is fixedly connected to the carrier.

5. A cartridge seal according to claim 1, wherein
   the rotating slide ring is axially moveable on the shaft protection sleeve,
   the rotating slide ring is subjected to a spring force in a direction of the stationary slide ring and
   a sealing means seals the rotating slide ring with respect to the shaft protection sleeve.

6. A cartridge seal according to claim 1, wherein the closed cavity is connected to the sealing gap between sliding surfaces of the rotating slide ring and the stationary slide ring via a radial gap between the stationary slide ring and the shaft protection sleeve.

7. A cartridge seal according to claim 1, wherein the shaft protection sleeve passes through the carrier and is connected to a holding ring which is provided for the rotationally fixed connection of the shaft protection sleeve to the shaft, and the holding ring forms a wall which is adjacent the cavity sealing ring.

8. A cartridge seal for sealing a shaft with respect to a casing, as a shaft seal arrangement for a centrifugal pump, the cartridge seal comprising:
   a shaft protection sleeve;
   fixing means for providing a rotationally fixed connection of the shaft protection sleeve to the shaft;
   a carrier for integrating the cartridge seal into a casing opening;
   a rotating slide ring rotationally fixed to the shaft protection sleeve;
   a stationary slide ring rotationally fixed to the carrier;
   a closed cavity, wherein the closed cavity is fluid conveyingly connected to a sealing gap which is formed between the rotating slide ring and the stationary slide ring, and the closed cavity is at least partly pre-filled with a fluid; and
   a sealing means for sealing the carrier with respect to the shaft protection sleeve, the sealing means comprising a cavity sealing ring which is configured as a lip seal and/or labyrinth seal.

* * * * *